(12) United States Patent
Wise

(10) Patent No.: US 9,078,105 B1
(45) Date of Patent: Jul. 7, 2015

(54) EVENT LOGGING AND REPLAY SYSTEM AND PROCESS FOR MOBILE COMMUNICATION PLATFORM

(71) Applicant: MTN Satellite Communications, Seattle, WA (US)

(72) Inventor: Robert M Wise, Issaquah, WA (US)

(73) Assignee: Maritime Telecommunication Network Inc., Seattle, WA (US)

( * ) Notice: Subject to any disclaimer, the term of this patent is extended or adjusted under 35 U.S.C. 154(b) by 0 days.

(21) Appl. No.: 14/335,350

(22) Filed: Jul. 18, 2014

(51) Int. Cl.
*H04W 4/00* (2009.01)
*H04W 4/02* (2009.01)
*H04W 4/04* (2009.01)

(52) U.S. Cl.
CPC .............. *H04W 4/027* (2013.01); *H04W 4/028* (2013.01); *H04W 4/025* (2013.01); *H04W 4/046* (2013.01)

(58) Field of Classification Search
USPC ......... 370/254, 310, 316, 328, 329, 464–465; 455/68, 405, 414.1, 414.2, 414.3; 701/25–26, 400, 408, 412, 468; 715/741, 742, 745, 747, 789
See application file for complete search history.

(56) References Cited

U.S. PATENT DOCUMENTS 7,574,661 B2 * 8/2009 Matsuura et al. ............. 715/745

* cited by examiner

*Primary Examiner* — Frank Duong
(74) *Attorney, Agent, or Firm* — FSP LLC

(57) ABSTRACT

A system includes a mobile communication platform (MCP) with logic to record network performance data along a first route taken by the MCP. The system includes logic to track one or more of MCP location, heading, or speed as MCP circumstances, and to apply the network performance data to predict application usage by passengers aboard the MCP along a second route taken by the MCP. The MCP circumstances may include a time of day, day of the week, calendar date, or weather conditions. The system may adjust a course, speed, or location of the MCP based on the predicted application usage.

15 Claims, 10 Drawing Sheets

| TIME | SENDING COMPONENT | SIGNAL | RECEIVING COMPONENT |
|---|---|---|---|
| 1. | NMS 112 | AVAILABLE BANDWIDTH | DATA AGGREGATOR 110 |
| 1. | ROUTER LOGGING API 102 | URLS | DATA AGGREGATOR 110 |
| 1. | ROUTER LOGGING API 102 | BPS | DATA AGGREGATOR 110 |
| 1. | ROUTER LOGGING API 102 | PACKET TYPES | DATA AGGREGATOR 110 |
| 1. | GPS 114 | COORDINATES | DATA AGGREGATOR 110 |
| 1. | MODEM API'S 104 | CIRCUIT USAGE | DATA AGGREGATOR 110 |
| 1. | RFID SENSORS 116 | USER LOCATIONS | DATA AGGREGATOR 110 |
| 2. | PASSENGER APPS 122 | USAGE | DATA AGGREGATOR 110 |
| 3. | DATABASE 120 | CLOCK TICK | DATA AGGREGATOR 110 |
| 4. | DATA AGGREGATOR 110 | RECORD | DATABASE 120 |

FIG. 2

EVENT LOGGING AND REPLAY SYSTEM AND PROCESS FOR MOBILE COMMUNICATION PLATFORM

CROSS-REFERENCE TO RELATED APPLICATIONS

Not Applicable.

BACKGROUND OF THE INVENTION

The infrastructure required to supply a high quality of continuous, two-way data communication to a mobile communication platform is expensive and complex. A variety of data bearers come into play at various points along a voyage. The various bearers have different capacities, costs per bit, QoS profiles, and geographic zones of coverage. Many variables are subject to optimization to approach any given performance or cost metrics. In the normal course of operation of an MCP, data may be collected at many points along the technical chain on actual performance as a function of time, space, user load, environmental conditions, and other inputs for later analysis and construction of statistical models.

Exemplarily queries would include: all voyages passing through a region, such a the vicinity of a port; all voyages on a common path between two points; all data from one voyage; data from part of one voyage; any of the previous queries limited to a single vessel or type of vessel, or configuration of vessel; any of the previous queries limited to inbound or outbound journeys.

BRIEF SUMMARY OF THE INVENTION

Not Applicable.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 is an action flow diagram of an embodiment of a process to record MCP performance on a voyage.

DETAILED DESCRIPTION OF THE INVENTION

Glossary

Figure 1:
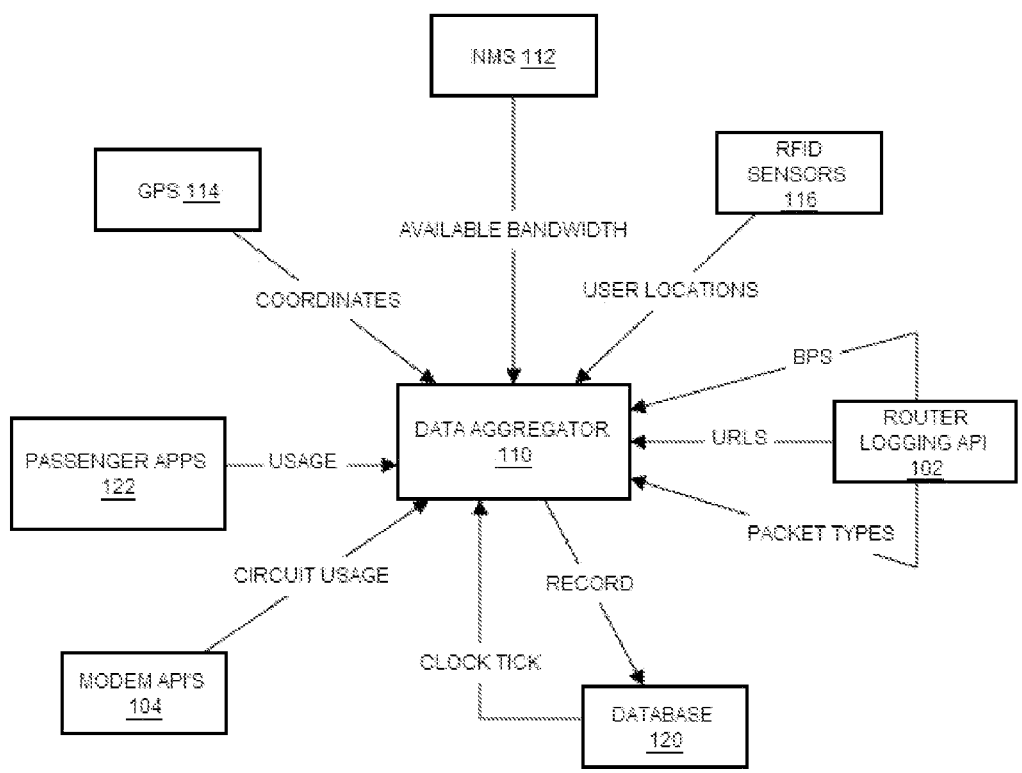
FIG. 1 is a system diagram of an embodiment of a process to record MCP performance on a voyage.

"API" in this context refers to (Application Programming Interface) a set of defined entry points (e.g., "functions") and controls (e.g., "parameters") to those entry points, and output behavior (e.g., "return values") to logic, that can be invoked to access specific functionality of the logic. For example, a phone might have a specific API that allows downloaded games to access a 3D graphics chip. Other APIs in the same phone might allow the game to control the vibrate motor, or send and receive text messages.

"App" in this context refers to (Application) a distinct set of logic that provides specific functionality for phones. Phones may come with some apps built-in, and may allow others to be downloaded and installed by the user. Examples of apps include: to-do list, game, drawing tool, calculator, email, web browser, game, photo editor, and a weather forecast tool.

"Application" in this context refers to logic that can be independently installed, accessed, and removed from a device, and which executes at lower permission levels and within confines as to functionality and device resource utilization as determined by operating system software. Often referred to as "regular" application logic, as opposed to driver, applet, or system logic; also, logic that causes a computer to perform tasks beyond the basic operation of the computer itself. The term "application" may be abbreviated in some contexts to simply "app". An application may be logic built upon or integrated with operating system logic. Examples of application logic include enterprise software, accounting software, office suites, graphics software, games, web browsers, and media players. Applications may be bundled with the computer and its system software or published separately. Application logic applies the capabilities of a particular computing platform or system software to a particular purpose. Some applications are available in versions for several different platforms; others have narrower requirements and are thus called, for example, a Geography application for Windows or an Android application for education or Linux gaming.

"Backhaul" in this context refers to In wireless networks, the connection from an individual base station (tower) to the central network (backbone). Typical backhaul connections are wired high-speed data connections (T1 line, etc.), but they can be wireless as well (using point-to-point microwave or WiMax, etc.) The intermediate links between a network and devices on the edge of the network (i.e., leaf nodes of the network). Backhaul may refer to the portions of a local or intermediate network (e.g., Internet Service Provider) that communicate with the global Internet.

"Bandwidth" in this context refers to a measure of the signal throughput capacity of a channel or connection, or the amount of said capacity required for communication of particular signals. Bandwidth refers to a number of signals, often "bits", that can be communicated over a channel in a given amount of time with acceptable noise/distortion. Bandwidth is typically measured in hertz (Hz), cycles per second, or bits or bytes per second.

"Database" in this context refers to an organized collection of data (states of matter representing values, symbols, or control signals to device logic), structured typically into tables that comprise 'rows' and 'columns', although this structure is not implemented in every case. One column of a table is often designated a "key" for purposes of creating indexes to rapidly search the database.

"event" in this context refers to a physical occurrence having unique coordinates in space-time.

"GPS" in this context refers to (Global Positioning System) logic to interact with multiple geosynchronous satellites to determine a terrestrial location. (Global Positioning System) a space-based satellite navigation system that provides location and time information in most weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver. The global positioning system is a location determination network that uses satellites to act as reference points for the calculation of position information.

"GUI" in this context refers to Graphical user interface.

"MCP" in this context refers to (Mobile Communications Platform), a vessel or vehicle capable of motion and including communication capabilities to one or more of satellite and fixed (not moving) antennas in the environment.

"Modem" in this context refers to (modulator-demodulator) a device that modulates a carrier signal to encode digital information, and also demodulates such a carrier signal to decode the transmitted information.

"NMS" in this context refers to (Network Management System), a machine or system of machines to manage bandwidth, quality of service, flow, and other features of a data network.

"RFID" in this context refers to Radio Frequency Identification Tag, a device that receives a radio signal and responds with a code that provides an identification of the tag. An RFID tag may be self powered (e.g. battery) or it may be a simple mixer circuit that does not require external power.

"Router" in this context refers to logic that distributes digital information that is contained within a data packet. Each data packet contains address information that a router can use to determine if the source and destination are on the same network, or if the data packet must be transferred from one network to another. This transfer to another type of network is achieved by encapsulating the data with network specific protocol header information. When multiple routers are used in a large collection of interconnected networks, the routers exchange information about target system addresses, so that each router can build up a table showing the preferred paths between any two systems on the interconnected networks.

"UI" in this context refers to (User Interface), the physically sensitive areas of a device that the user interacts with directly. Broadly, this can include hardware such as the display, buttons, other controls, and mechanical features. More commonly, the UI refers to the software-controlled visual elements displayed on the screen that allow the user to interact with the device. This includes menus, icons, text entry boxes, etc. Although the term can also be used for hardware input such as microphones, contact switches, or keys, it is used most frequently to refer to the software-controlled elements displayed on a machine optical output device (e.g., display) that are used to interact with the device. That includes icons, buttons, menus, text boxes, etc.

DESCRIPTION

FIG. 1 is a system diagram of an aspect of the invention to log data on the performance and status of pieces of the infrastructure of an MCP network, usage of the network, loads on the network, backhaul connectivity, MCP location, and other factors at regular intervals over the course of an MCP journey.

Sensors and APIs stream data continuously to a data aggregator. For numerical data, the data aggregator maintains a temporal moving average of each input over a set window. Unstructured inputs are accumulated in circular buffers. At a set periodic interval, a database sends a clock tick to the data aggregator and receives in return a record containing a snapshot of the state of the data accumulated. Data that is recorded/aggregated may include geolocation, heading, course, speed, and bandwith/connectivity/backhaul conditions for the MCP data network, and usage information about application logic utilized by passengers aboard the MCP at the various conditions.

Figure 4:
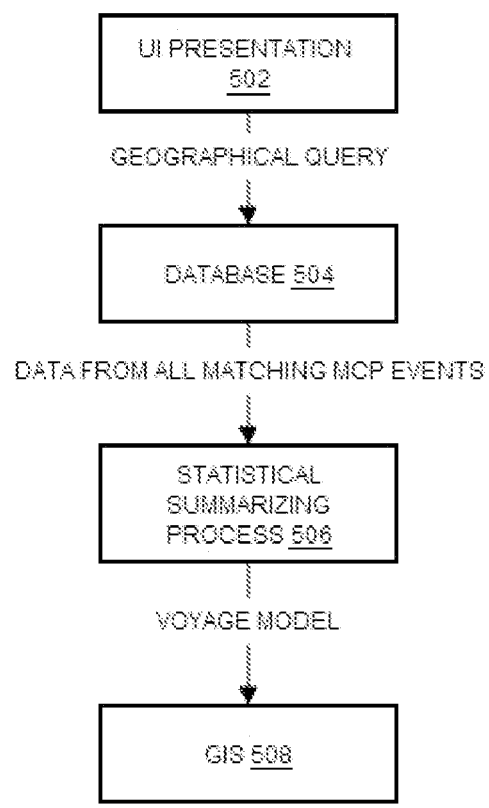
FIG. 4 is a system diagram of an embodiment of a process to replay events.

FIG. 4 is a system diagram of an aspect of the invention to summarize, analyze, and model data accumulated from one or more MCP journeys. Queries are composed on a graphical user interface. Matching date are retrieved from a database and sent to a summarizing process. Summaries are displayed for analysis in a GIS (geographical information system) presentation.

An embodiment of the system includes a mobile communication platform (MCP) with logic to record network performance data along a first route taken by the MCP. The system includes logic to track one or more of MCP location, heading, or speed as MCP circumstances, and to apply the network performance data to predict application usage by passengers aboard the MCP along a second route taken by the MCP. The MCP circumstances may include a time of day, day of the week, calendar date, or weather conditions. The system may adjust a course, speed, or location of the MCP based on the predicted application usage.

Figure 8:
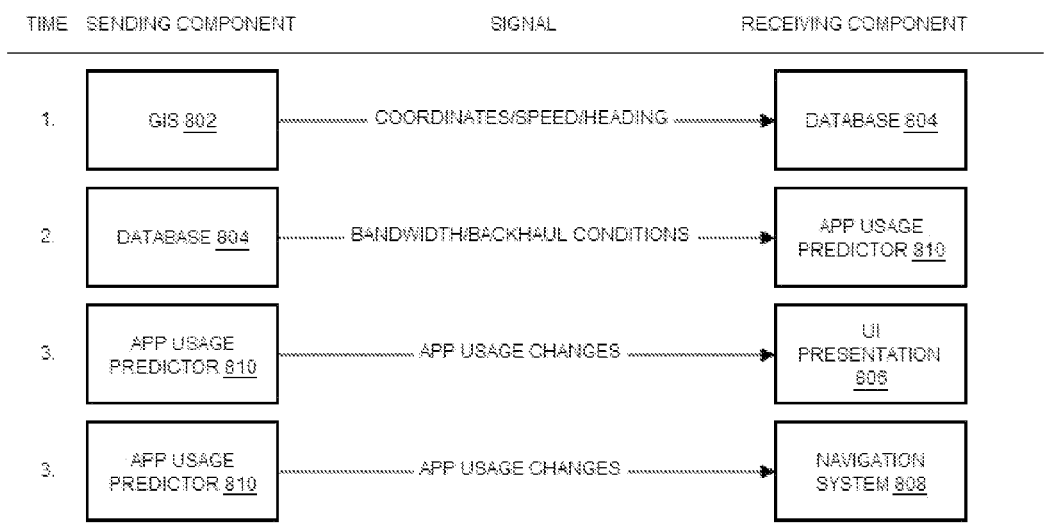
FIG. 8 is an action flow diagram of an embodiment of application usage predictor process.

FIG. 8 is a system diagram of an aspect of the invention to simulate the effects of alterations in MCP heading, velocity, and course on application usage by passengers aboard the MCP. Network usage/load information, available bandwidth, and/or backhaul connectivity information (collectively, 'network performance') are extracted from the database for a given geo-coordinate, speed, heading, and/or course coordinate. The usage/load information, bandwidth information, and/or backhaul connectivity may be data recorded from actual physical behavior of the MCP at the coordinate/speed/heading, or may be from different coordinates known to have similar usage/load, bandwidth, and/or backhaul conditions. The system predicts an effect on application usage by passengers aboard the MCP for the conditions. In some embodiments the conditions may be further refined to the particular time of day, day of the week, progress along an MCP route (e.g., how close to the beginning, middle, or end), and other dynamic factors.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

DRAWINGS

Figure 3:
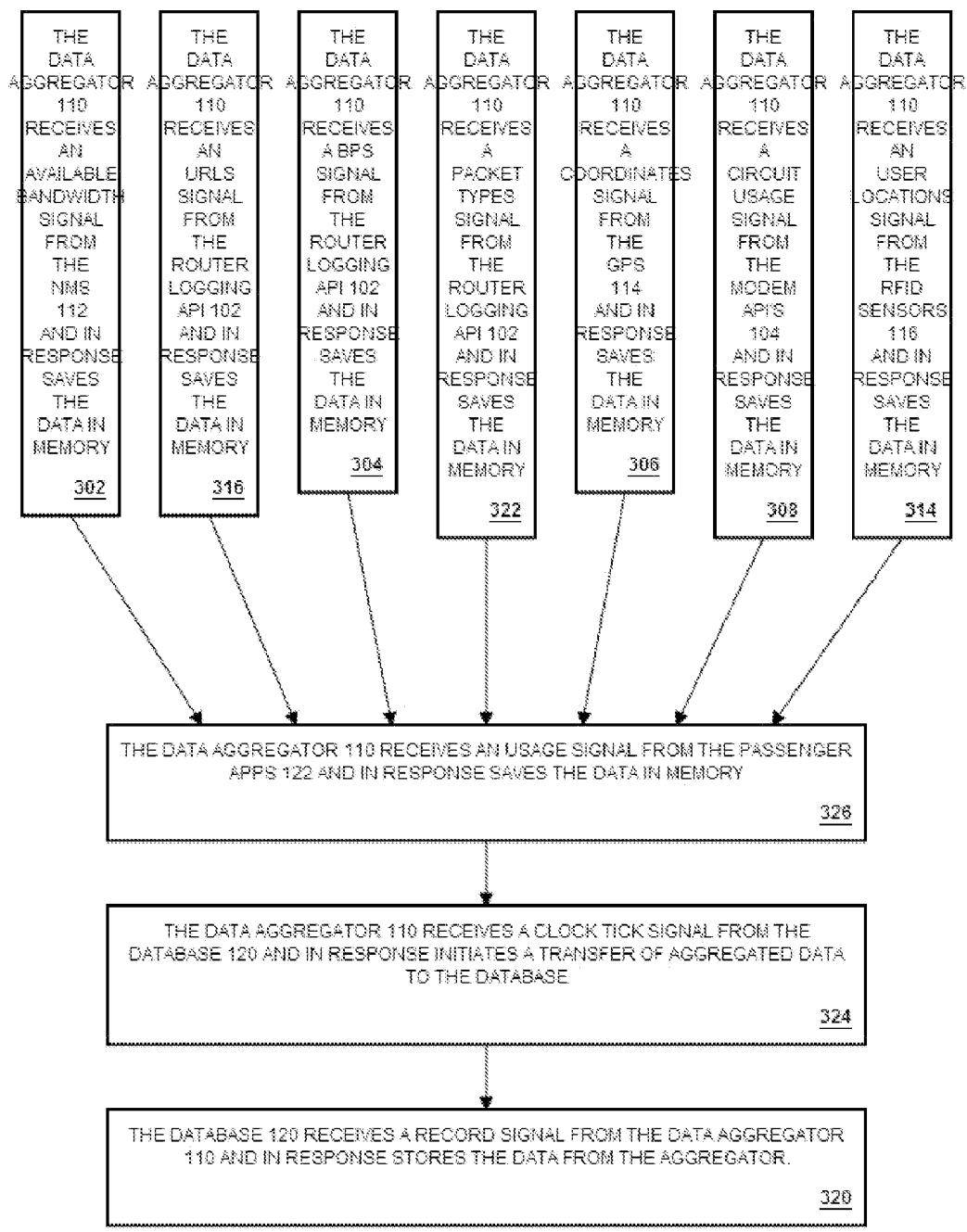
FIG. 3 is a flow chart of an embodiment of a process to record MCP performance on a voyage.

FIG. 1 is a system diagram of an embodiment of a process to record MCP performance on a voyage. FIG. 2 is an action flow diagram of an embodiment of a process to record MCP performance on a voyage. FIG. 3 is a flow chart of an embodiment of a process to record MCP performance on a voyage. The system comprises router logging api 102, modem api's 104, data aggregator 110, NMS 112, GPS 114, RFID sensors 116, database 120, and passenger apps 122. The data aggregator 110 receives an available bandwidth signal from the NMS 112 and in response saves the data in memory (302). The data aggregator 110 receives an URLS signal from the router logging api 102 and in response saves the data in memory (316). The data aggregator 110 receives a bps signal from the router logging api 102 and in response saves the data in memory (304). The data aggregator 110 receives a packet types signal from the router logging api 102 and in response saves the data in memory (322). The data aggregator 110 receives a coordinates signal from the GPS 114 and in response saves the data in memory (306). The data aggregator 110 receives a circuit usage signal from the modem api's 104 and in response saves the data in memory (308). The data aggregator 110 receives an user locations signal from the RFID sensors 116 and in response saves the data in memory (314). The data aggregator 110 receives an usage signal from the passenger apps 122 and in response saves the data in memory (326). The data aggregator 110 receives a clock tick signal from the database 120 and in response initiates a transfer of aggregated data to the database (324). The database 120 receives a record signal from the data aggregator 110 and in response stores the data from the aggregator. (320).

Figure 5:
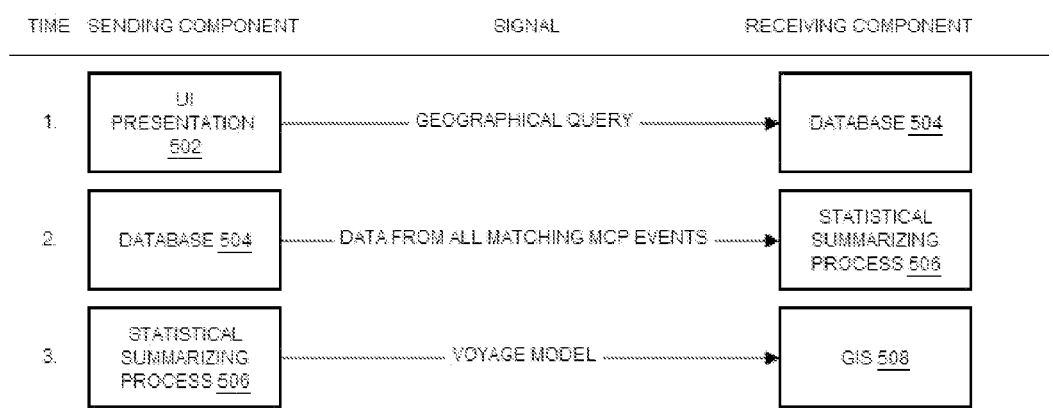
FIG. 5 is an action flow diagram of an embodiment of a process to replay events.
Figure 6:
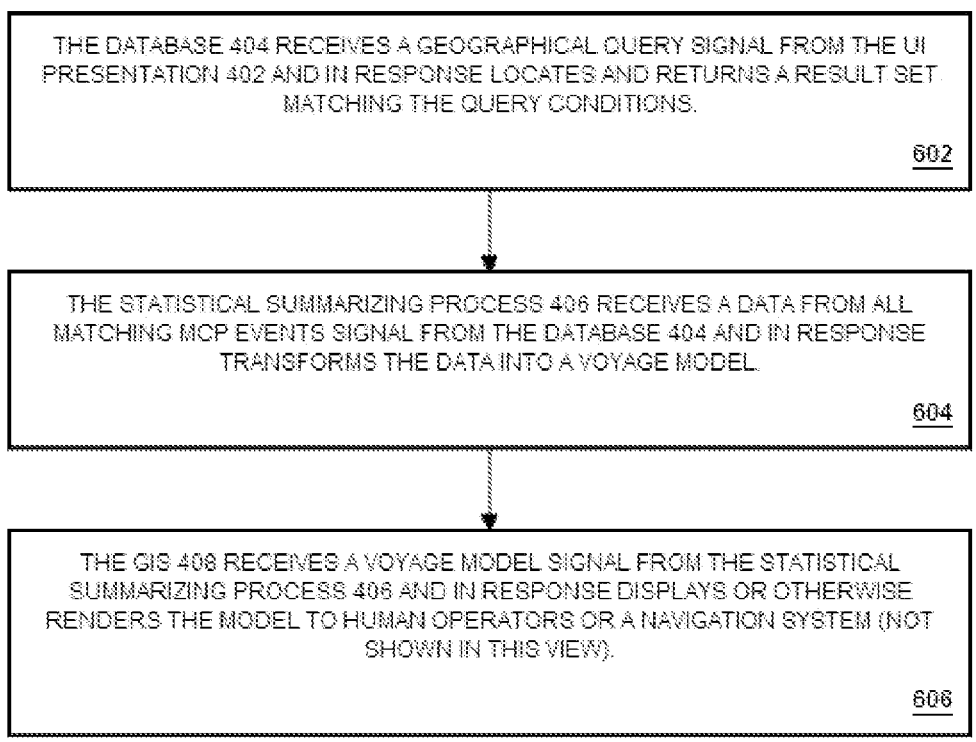
FIG. 6 is a flow chart of an embodiment of a process to replay events.

FIG. 4 is a system diagram of an embodiment of a process to replay events. FIG. 5 is an action flow diagram of an embodiment of a process to replay events. FIG. 6 is a flow chart of an embodiment of a process to replay events. The system comprises UI presentation 402, database 404, statistical summarizing process 406, and GIS 408. The database 404 receives a geographical query signal from the UI presentation 402 and in response locates and returns a result set matching the query conditions. (602). The statistical summarizing process 406 receives a data from all matching MCP events signal from the database 404 and in response transforms the data into a voyage model (604). The GIS 408 receives a voyage model signal from the statistical summarizing process 406 and in response displays or otherwise renders the model to human operators or a navigation system (not shown in this view). (606).

Figure 7:
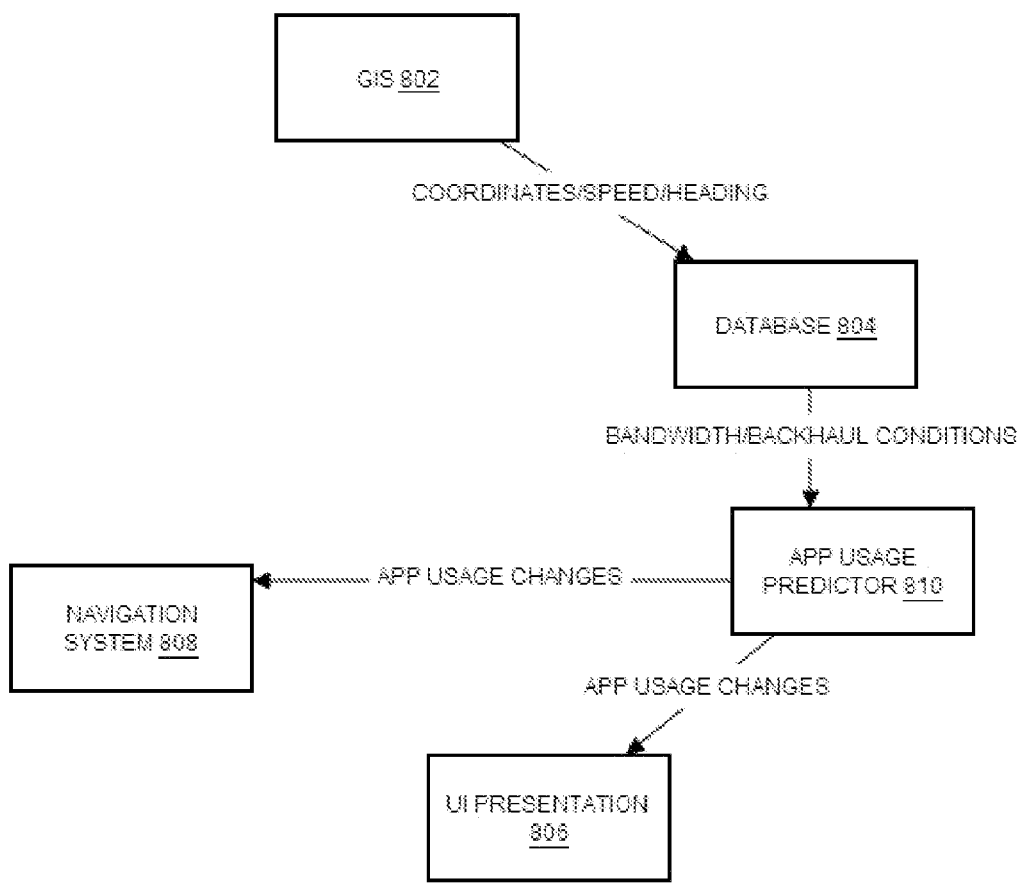
FIG. 7 is a system diagram of an embodiment of an application usage predictor.
Figure 9:
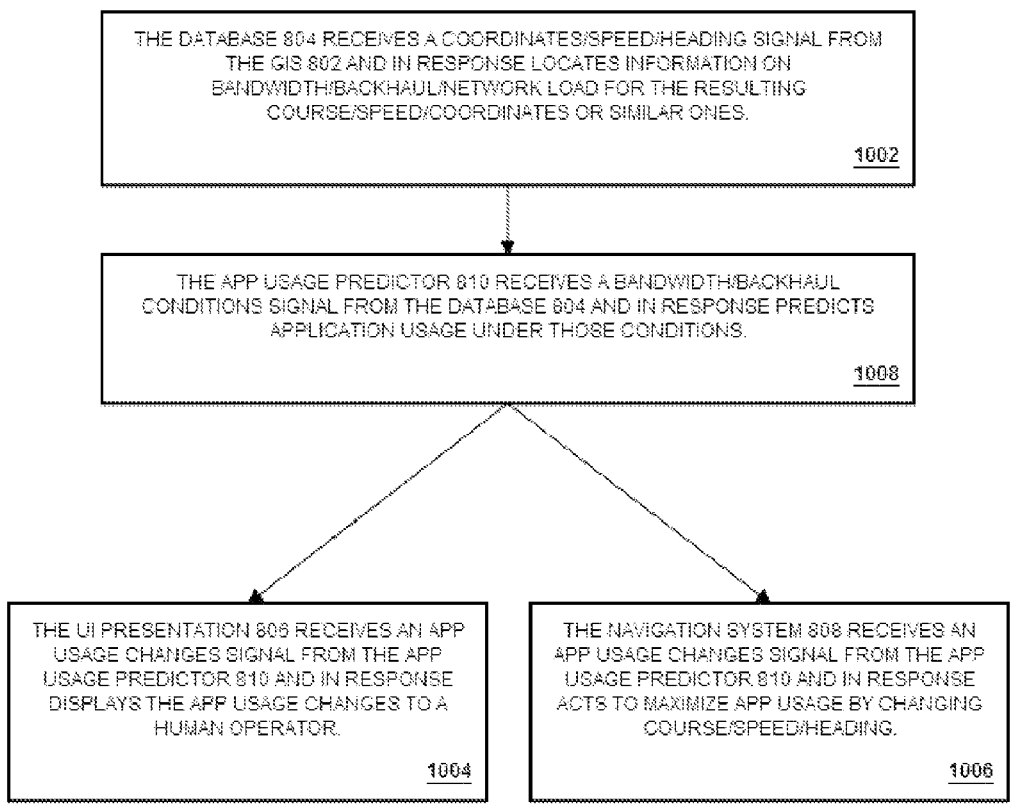
FIG. 9 is a flow chart of an embodiment of application usage predictor process.

FIG. 7 is a system diagram of an embodiment of an application usage predictor. FIG. 8 is an action flow diagram of an embodiment of application usage predictor process. FIG. 9 is a flow chart of an embodiment of application usage predictor process. The system comprises GIS 702, database 704, UI presentation 706, navigation system 708, and app usage predictor 710. The database 704 receives a coordinates/speed/heading signal from the GIS 702 and in response locates information on bandwidth/backhaul/network load for the resulting course/speed/coordinates or similar ones (902). The app usage predictor 710 receives a bandwidth/backhaul conditions signal from the database 704 and in response predicts application usage under those conditions (908). The UI presentation 706 receives an app usage changes signal from the app usage predictor 710 and in response displays the app usage changes to a human operator (904). The navigation system 708 receives an app usage changes signal from the app usage predictor 710 and in response acts to maximize app usage by changing course/speed/heading. (906).

Figure 10:
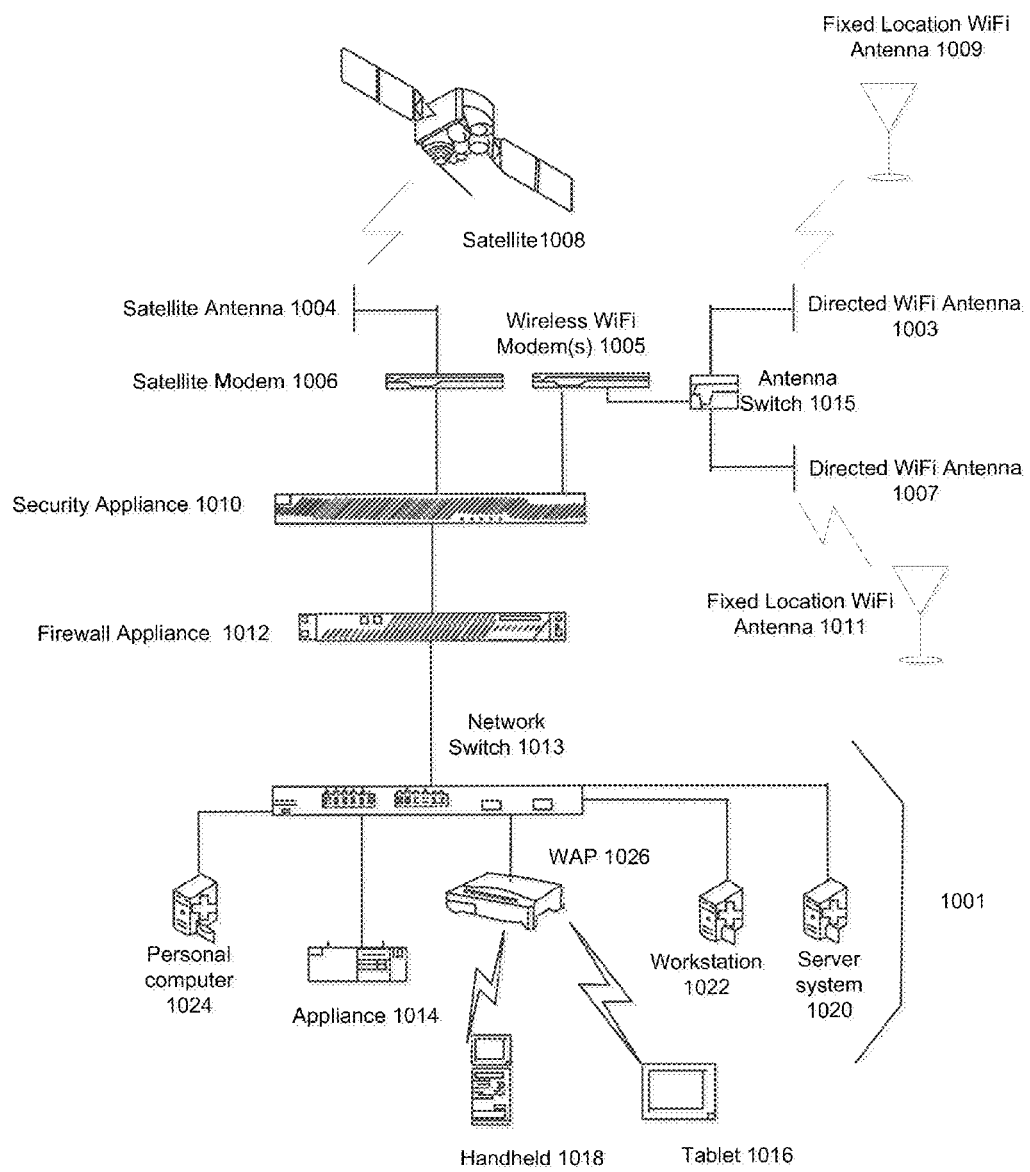
FIG. 10 is a figure illustrating a machine system to implement aspects of the described systems and processes.

FIG. 10 illustrates an embodiment of a machine system that may be utilized to implement aspects of the systems and processes described herein. Communication is carried out between devices of a local area network (LAN) 1001 and a wide area network (WAN) (e.g., the Internet) via a satellite antenna 1004 and satellite 1008. The LAN 1001 includes server systems 1020, personal computers 1024, appliances 1014, tablets 1016, handheld (mobile) devices 1018, and workstations 1022. A WAP 1026 provides wireless access to the LAN 1001. Of course, a typical LAN includes other devices as well, such as printers, faxes, scanners, etc. The networks are bridged via a system of devices including (in this example) a satellite modem 1006, a security appliance 1010, a firewall appliance 1012, and a network switch 1018. The security appliance 1010 (e.g., Cisco 5510) provides, for example, firewall and VPN (virtual private network) concentration, intrusion detection, and intrusion prevention. The firewall appliance 1012 (e.g., Barracuda) provides, for example, anti-virus and anti-fishing protection for the LAN 1001, and web, email, and file content filtering. Communication traffic is switched between the LAN 1001 and the WAN by a network switch 1018. The WAN may also be accessed in some circumstances via WiFi (e.g., wireless proximity to one or more fixed location WiFi antennas 1009 and 1011). A WiFi 'modem' 1005 may provide signals to an antenna switch 1015, which in turn provides the signals to one or more directed WiFi antennas 1003, 1007. The signals are communicated to and from the antennas 1003, 1007 using WiFi to one or more fixed location WiFi antennas 1009 and 1011.

What is claimed is:

1. A mobile computing system for use with an MCP (mobile communication platform), comprising:
    logic to record network performance data along a first route taken by the MCP;
    logic to track an MCP location and heading and to correlate the MCP location and heading with the network performance data; and
    logic to apply the network performance data to form a predicted level of application usage by passengers aboard the MCP along a second route taken by the MCP, the predicted level of application usage formed from a correlation of the MCP location and heading with the network performance data.

2. The mobile computing system of claim 1, further comprising:
    logic to correlate a time of day, day of the week, or calendar date with the MCP location and heading and the network performance data.

3. The mobile computing system of claim 1, further comprising:
    logic to adjust a course, speed, or location of the MCP based on the predicted level of application usage.

4. The mobile computing system of claim 3, further comprising:
    logic to adjust the course, speed, or location of the MCP to maximize the predicted level of application usage.

5. The mobile computing system of claim 1, further comprising:
    logic to correlate weather conditions with the MCP location and heading and the network performance data.

6. A method for forming a predicted level of application usage aboard a MCP (mobile communication platform), comprising:
    recording network performance data along a first route taken by the MCP;
    tracking an MCP location and heading and correlating the MCP location and heading with the network performance data; and
    applying the network performance data to form the predicted level of application usage by passengers aboard the MCP along a second route taken by the MCP, the predicted level of application usage formed from a correlation of the MCP location and heading with the network performance data.

7. The method of claim 6, further comprising:
    correlating a time of day, day of the week, or calendar date with the MCP location and heading and the network performance data.

8. The method of claim 6, further comprising:
adjusting a course, speed, or location of the MCP based on the predicted level of application usage.

9. The method of claim 8, further comprising:
adjusting the course, speed, or location of the MCP to maximize the predicted level of application usage.

10. The method of claim 6, further comprising:
correlating weather conditions with the MCP location and heading and the network performance data.

11. A non-transitory computer-readable storage medium having stored thereon instructions including instructions that, when executed by a processor, configure the processor to perform a method comprising:
recording network performance data along a first route taken by the MCP;
tracking an MCP location and heading and correlating the MCP location and heading with the network performance data; and
applying the network performance data to form a predicted level of application usage by passengers aboard the MCP along a second route taken by the MCP, the predicted level of application usage formed from a correlation of the MCP location and heading with the network performance data.

12. The non-transitory computer-readable storage medium of claim 11, further comprising instructions that, when executed by the processor, configure the processor to perform the method comprising:
correlating a time of day, day of the week, or calendar date with the MCP location and heading and the network performance data.

13. The non-transitory computer-readable storage medium of claim 11, further comprising instructions that, when executed by the processor, configure the processor to perform the method comprising:
adjusting a course, speed, or location of the MCP based on the predicted level of application usage.

14. The non-transitory computer-readable storage medium of claim 13, further comprising instructions that, when executed by the processor, configure the processor to perform the method comprising:
adjusting the course, speed, or location of the MCP to maximize the predicted level of application usage.

15. The non-transitory computer-readable storage medium of claim 11, further comprising instructions that, when executed by the processor, configure the processor to perform the method comprising:
correlating weather conditions with the MCP location and heading and the network performance data.

\* \* \* \* \*